United States Patent [19]

Weltzien et al.

[11] Patent Number: 4,919,702
[45] Date of Patent: Apr. 24, 1990

[54] FERTILIZER AND/OR SOIL AMENDMENT

[75] Inventors: Robert F. Weltzien; Graeme Berlyn, both of Hamden, Conn.

[73] Assignee: Soilizer Corporation, New Haven, Conn.

[21] Appl. No.: 345,521

[22] Filed: May 3, 1989

Related U.S. Application Data

[63] Continuation-in-part of Ser. No. 191,954, May 9, 1988, Pat. No. 4,846,870.

[51] Int. Cl.$^5$ .............................................. C05F 11/02
[52] U.S. Cl. ........................................ 71/24; 71/11; 71/23; 71/27
[58] Field of Search ................... 71/1, 11, 2 B, 24, 27

[56] References Cited

U.S. PATENT DOCUMENTS

| 2,570,537 | 10/1951 | Finch | 71/2.5 |
| 3,264,084 | 8/1966 | Karcher | 71/24 |
| 3,940,257 | 2/1976 | Sherwin et al. | 71/23 |
| 4,589,906 | 5/1986 | Brunn et al. | 71/80 |
| 4,787,307 | 11/1988 | Marihart | 71/11 |
| 4,846,870 | 7/1989 | Weltzien et al. | 71/27 |

FOREIGN PATENT DOCUMENTS

| 750594 | 11/1970 | Belgium | 71/24 |
| 1039077 | 9/1978 | Canada | 71/24 |
| 0695993 | 11/1979 | U.S.S.R. | 71/24 |

Primary Examiner—Ferris H. Lander
Attorney, Agent, or Firm—Bachman & LaPointe

[57] ABSTRACT

The present invention relates to a fertilizer and/or soil amendment containing L ascorbic acid, marine algae, and humic acid. The fertilizers may also contain nitrogen, phosphorous and/or potassium. The fertilizers and/or soil amendments may be produced in a solid form or a liquid form. The fertilizers have utility in promoting the growth of grass and plants. Methods of preparing the fertilizers and/or soil amendments are also described.

9 Claims, No Drawings

FERTILIZER AND/OR SOIL AMENDMENT

CROSS-REFERENCE TO RELATED APPLICATIONS

This is a continuation-in-part of allowed U.S. patent application Ser. No. 191,954, filed May 9, 1988, for a FERTILIZER AND/OR SOIL AMENDMENT By Robert F. Weltzien et al now U.S. Pat. No. 4,846,870, July 11, 1989.

BACKGROUND OF THE INVENTION

The present invention relates to a biostimulant comprising a solution suitable for use as fertilizer for promoting the growth of grass and plants and as a soil amendment. The invention also relates to a method of preparing the solution.

Many different types of grass and plant fertilizers and/or soil amendments are used commercially. U.S. Pat. No. 4,589,906 to Brunn et al. illustrates a fertilizer composition suited for fertilizing the leaves or full systems of plants growing in soil or in water.

Some fertilizers and/or soil amendments are based on sources of humic acid such as lignite or leonardite ore while others are based on marine algae such as kelp or seaweed. U.S. Pat. No. 2,570,537 to Finch for example illustrates a process for producing colloidal humus for use in horticulture or agriculture to assist the germination of seeds, the rooting and growth of cuttings, and the growth of seedlings and plants and to improve the fertility of the soil. The process consists of passing a composite solution containing a salt of alginic acid, inorganic plant food substances and plant growth hormones through a bed containing peat which has been inoculated with soil bacteria, collecting the fluid drained from the bed, precipitating the fluid in a bath of soluble calcium salt, straining the precipitate, removing residual fluid therefrom and drying the product so obtained. U.S. Pat. No. 3,264,084 to Karcher exemplifies a soil nutrient formed from lignite-leonardite ore. U.S. Pat. No. 3,940,257 to Sherwin et al. exemplifies a soil conditioning and fertilizer compound composed of particulate seaweed intimately mixed with particulate tree bark.

Despite the numerous fertilizers and soil amendments commercially available, there is still a demand for improved products capable of serving a variety of needs.

Accordingly, it is an object of the present invention to provide a solution which can be used in both horticulture and agriculture as a fertilizer with grass and plants as well as a soil amendment.

It is further object of the present invention to provide a relatively simple and inexpensive method for preparing the above solution.

It is yet further object of the present invention to provide a solid form of a solution formulation suitable for use as a fertilizer for grass and plants and as a soil amendment.

These and further objects and advantages will become more apparent from the following description.

SUMMARY OF THE INVENTION

In accordance with the present invention, the foregoing objects and advantages are obtained using aqueous solutions consisting essentially of from about 0.05% to about 15% L ascorbic acid, from about 10% to about 50% marine algae and the balance humic acid and water. The humic acid in these solutions is preferably present in an amount from about 30% to about 80% and most preferably in an amount from about 55% to about 65%. As used herein, the percentages are volume percentages unless otherwise specified. As used herein the term solution includes suspensions, emulsions and dispersions. Solutions with the above formulation have been found to have utility both as a fertilizer for promoting the growth of grass and plants and as a soil amendment.

Solutions having a composition or formulation consisting essentially of from about 0.5% to about 2% L ascorbic acid, from about 10% to about 50% marine algae, from about 30% to about 80% humic acid and the balance essentially water have been found to be particularly useful in promoting root growth of grass and plants. Solutions having a composition or formulation consisting essentially of from about 4% to about 6% L ascorbic acid, from about 10% to about 50% marine algae, and from about 30% to about 80% humic acid and the balance essentially water have been found to be particularly useful in promoting overall plant growth.

It is believed that solid compounds having similar formulations provide equally beneficial results. A particularly useful solid composition appears to be one which includes a humus solid such as a salt of humic acid, marine algae and L ascorbic acid added as potassium or sodium ascorbate with the weight ratio of the humic acid salt to the L ascorbic acid being from about 2:1 to about 5:1 and the weight ratio of marine algae to L ascorbic acid being from about 1:1 to about 2:1.

For reasons to be explained in more detail hereinafter, the method of preparing the solutions of the present invention has been found to be quite important. Broadly this method comprises adding L ascorbic acid in a dry state to water to form a solution having a pH in the range of from about 4.0 to about 6.0, preferably from about 5.5 to 6.0, adding marine algae and finally adding humic acid in a water solution. If necessary, a neutralizing agent such as sodium hydroxide or potassium hydroxide may be added to raise the pH to a pH in the range of from abut 5.5 to abut 7.0.

Another solution which has been found to be quite useful for its increased nutritional value is an aqueous solution consisting essentially of from about 0.1 to about 10% L ascorbic acid, from about 10% to about 50% marine algae, from about 3.0% to about 20% nitrogen, from about 3.0% to about 20% phosphorous, from about 3.0% to about 20% potassium and the balance humic acid in a water solution. The nitrogen, phosphorous and potassium serve to improve the nutritional value of the fertilizer. A preferred embodiment of this solution consists essentially of from about 2.0% to about 4.0% L ascorbic acid, from about 12.5% to about 20% marine algae, from about 3.0% to about 10.0 % nitrogen, from about 3.0% to about 10.0% phosphorous, from about 3.0% to about 10.0% potassium and the balance humic acid in a water solution. A method for forming this solution is also disclosed. The above percentages for this solution are weight percentages.

DETAILED DESCRIPTION

As previously discussed, aqueous solutions and solid compounds in accordance with the present invention may be used as a fertilizer or soil amendment to stimulate the root growth of grass, sod and plants. They may also be used to stimulate overall plant growth and as a soil amendment. As used herein, the term solution includes suspensions, emulsions and dispersions.

Solutions in accordance with one aspect of the present invention are aqueous solutions consisting essentially of from about 0.5% to about 15%, preferably from about 1% to about 5%, L ascorbic acid, from about 10% to about 50%, preferably from about 20% to about 35%, marine algae, and the balance humic acid in a water solution. For many applications, humic acid is in the solution in an amount from abut 30% to about 80%, and preferably in a volume from 55% to about 65%. In dilute forms of the solution humic acid may be present in an amount from about 30% to about 40%. In concentrated forms of the solution humic acid may be present in an amount from about 60% to about 70%. Water may be present in a volume up to about 50% of the solution in the dilute solutions and up to about 10% in the concentrated solutions.

The L ascorbic acid is believed to be a significant ingredient in the solutions of the present invention. It is believed that the L ascorbic acid in these solutions detoxifies the possible effects of residual pesticides or herbicides formed from synthetic auxins or other growth regulators in soil. It is also believed that the L ascorbic acid promotes wood formation in plants such as pines and promotes an increased rate of plant biomass production. The implications of this are quite important to food crop agriculture systems as well as to forestry, horticulture, agroforestry and turf grass production.

The humic acids in the solution may comprise acid radicals in Leonardite or Lignite. Alternatively, the humic acids in the solution may be extracted from peat or other organic materials. The humic acid as will be seen hereinafter is present in the solution in the form of humic acid in a water solution. The marine algae in the solution preferably comprises kelp or seaweed in a liquid form.

Some particularly useful solution formulations for promoting root growth and overall plant growth have been identified. To promote root growth, an aqueous solution consisting essentially of from about 0.5% to about 2% L ascorbic acid, from about 10% to about 50%, preferably about 20% to about 35%, marine algae, from about 30% to about 80%, preferably from about 55% to about 65%, humic acid and the balance essentially water may be used. To promote overall plant growth, an aqueous solution consisting essentially of from about 4% to about 6% L ascorbic acid, from about 10% to about 50%, preferably from about 20% to about 35%, marine algae, from about 30% to about 80%, preferably from about 55% to about 65%, humic acid and the balance essentially water may be used.

It is believed that a solid form of the humic acid, marine algae, and L ascorbic acid formulations of the present invention may be used with equally beneficial results. A solid compound in accordance with the present invention suitable for use as a fertilizer for grass and plants and as a soil amendment consists essentially of a humus solid such as a salt of humic acid, marine algae and L ascorbic acid in the form of an ascorbate such as potassium or sodium ascorbate with the weight ratio of the humic acid salt to L ascorbic acid being from about 2:1 to about 5:1 and the weight ratio of the marine algae to L ascorbic acid being from about 1:1 to about 2:1.

It has been found that the method of preparing the aqueous solutions of the present invention may be important. L ascorbic acid has a pH of 2 while certain humic acid and marine algae each have a pH in the range of 9-10. Unless the solution ingredients are mixed in a particular order, a solid crust may be formed at the top of the solution as a result of the extreme pH differences of the present invention, from about 10 to 25 parts ascorbic acid are added to about 50 parts to about 500 parts water. At this point, from about 5 to about 10 parts of a neutralizing substance such as potassium hydroxide or sodium hydroxide may be added to the mixture so as to form a solution having a pH in the range of from about 5.5 to about 7.0, preferably from about 6.0 to about 6.5. After this, from 100 parts to abut 300 parts marine algae is added. In the final step, from abut 300 to about 600 parts humic acid is added to the solution. In the above formula, the ascorbic acid is in powder or granule form; the neutralizer may be in liquid or granule form and the marine algae and humic acid are both solids suspended in water. The solids level may be similar to the solid form of the product described in the next paragraph.

In those cases where the pH of the humic acids and the marine algae are neutral, mixing order is not important.

A solid form of the compositions of the present invention may be formed by mixing together potassium or sodium ascorbate, marine algae and a humic acid salt in the aforementioned ratios. For example, a useful composition consists of about 250 grams potassium ascorbate, 250 grams marine algae and 500 grams humic acids.

To demonstrate the utility of the solutions of the present invention, the following example was performed.

EXAMPLE I

A series of experiments was conducted with several hundred seedlings of loblolly pine (*Pinus taeda*) and Caribbean pine (*Pinus caribaea* Var. hondurensis). The seedlings were randomly treated with solutions containing 60% humic acid, 30% marine algae, and either 0, 1, 2 or 5% L ascorbic acid, balance water. The solutions were diluted 100:1 with water prior to being applied. In every case, the seedlings treated with a solution containing L ascorbic acid exhibited superior growth as compared to those seedlings receiving solutions without any L ascorbic acid.

In these experiments all plants were grown in close proximity in the same greenhouse under conditions as similar as possible in a greenhouse environment.

The improved growth using the formulations containing L ascorbic acid was apparent within two weeks after treatment. New needle growth of the seedlings was observed to be almost double for seedlings treated with solutions containing L ascorbic acid as compared to seedlings treated with solutions without any L ascorbic acid. The plants treated with the L ascorbic acid formulations also produced more chlorophyll as indicated by their deeper green color.

It has been found that the nutritional value of the fertilizer solutions of the present invention can be increased by adding nitrogen, phosphorous and/or potassium. While it is desirable to add all three of these additional constituents, solutions having increased nutritional value may contain only one or two of these additional constituents.

A useful solution composition has been found to be one which consists essentially of from about 0.1% to about 10% L ascorbic acid, from about 10% to about 50% marine algae, from about 3.0% to about 20% nitrogen, from about 3.0% to about 20% phosphorous, from about 3.0% to about 20% potassium and the balance humic acid in a water solution. As previously mentioned, these percentages are weight percentage. This solution may be formed by adding from about 1 g/1 to about 150 g/1 L ascorbic acid in from about 10 ml to about 150 ml water (in a liter of final solution), adding from about 10% to about 30% by volume (from about 100 ml to about 300 ml per liter solution) of marine algae in liquid form, dissolving from about 30 grams to about 200 grams each of nitrogen, phosphorous and potassium in solid form in the above solution, adding from about 300 ml to about 700 ml of humic acid in a water solution.

A preferred embodiment of the above solution consists essentially of from about 2.0% to about 4.0% L ascorbic acid, from about 12.5% to about 20% marine algae, from about 3.0% to about 10% nitrogen, from about 3.0% to about 10.0% phosphorous, from about 3.0% to about 10.0% potassium and the balance humic acid in a water solution. This solution may be formed by adding from about 20 grams to about 40 grams of L ascorbic acid to about 100 ml of water, adding from about 125 ml to about 200 ml per liter solution of marine algae in liquid form, dissolving from about 30 grams to about 100 grams of nitrogen in solid form in the solution, dissolving from about 30 grams to about 100 grams of potassium in solid form in the solution, dissolving from about 30 grams to about 100 grams of phosphorous in solid form in the solution, adding approximately 125 ml to about 200 ml water to put the solids in suspension, and adding from about 400 ml to about 650 ml of humic acid in a water solution.

Nitrogen may be added to the above solutions as ammonium phosphate, calcium nitrate, ammonium sulphate, ammonium nitrate, Chilean nitrate, other nitrates, other forms of nitrogen and mixtures thereof.

Phosphorous may be added to the above solutions in any suitable form such as sodium phosphate monobasic, sodium phosphate dibasic, potassium phosphate, phosphoric acid, other phosphorous salts, and mixtures thereof.

Potassium may be added to the above solutions in any suitable form including, but not limited to, potassium phosphate, potassium iodide, other potassium salts and mixtures thereof.

Potassium phosphate may be used to provide both phosphorous and potassium within the above specified ranges. When potassium phosphate is used, a suitable quantity of sodium hydroxide or potassium hydroxide may be used to buffer the product and achieve a stable pH in the range of from about 6 to 8. Preferably, the sodium hydroxide is added in an amount from about 15% to about 20% of the amount of potassium phosphate.

To demonstrate the utility of the above solutions containing nitrogen, phosphorous and potassium, the following example was performed.

EXAMPLE II

An experiment was conducted on coffee plants to measure the effect of a composition containing ascorbic acid, marine algae, nitrogen, phosphorous, potassium and humic acid in a water solution as compared to the effect of a nitrogen-phosphorous- potassium fertilizer. The composition of the test solutions are shown in Table I. All solutions were mixed 100 l with water prior to being applied.

TABLE I

| CONSTITUENT | COMP. A | COMP. B | COMP. C | COMP. D |
| --- | --- | --- | --- | --- |
| ASCORBIC ACID | | | 22 G | 20 G |
| WATER | | | 100 G | 100 G |
| KELP EXTRACT | | | 200 G | 200 G |
| HUMIC ACIDS | | | 640 G | 640 G |
| NITRATE | 12 G | 24 G | 12 G | 24 G |
| PHOSPHORUS | 24 G | 48 G | 24 G | 48 G |
| POTASSIUM | 12 G | 24 G | 12 G | 24 G |
| TOTAL | 48 G | 96 G | 1000 G | 1048 G |

All coffee plants were grown in close proximity in the same greenhouse under conditions as similar as possible. The leaf area of the plants was measured at two months. Table II reports the results.

TABLE II

| COMPOSITION | AVERAGE LEAF AREA (Sq. Cm.) |
| --- | --- |
| A | 4013 |
| B | 4440 |
| C | 5323 |
| D | 4982 |

As can be seen from these results, the coffee plants treated with the compositions of the present invention show improved leaf growth.

If desired, other minerals may be added to the solutions of the present invention. The following table illustrates the minerals which can be added, the form in which it may be added and a useful amount for each mineral.

| Mineral | Form | WT % of Solution |
| --- | --- | --- |
| Mg | Magnesium sulphate | approx .01–0.2 |
| Mn | Manganese chloride | approx .01–0.2 |
| B | Boric acid | approx .001–0.1 |
| Zn | Zinc sulphate | approx .001–0.1 |
| Cu | Copper sulphate | approx .001–0.1 |
| Co | Cobalt chloride | approx .001–0.1 |
| Ca | Calcium sulphate | approx .001–0.1 |
| Mo | Sodium molybdate | approx .001–0.1 |

The above minerals help make up for any deficiency of trace minerals in the soil and/or growth medium. Such deficiencies are known to cause poor growth in all plants.

Additionally, up to 3.0 wt % of iron as iron sulphate or ethylene diamine tetra acetic acid may be added to increase greening in the plants.

Based on still other experiments, it is believed that fertilizer solutions in accordance with the present invention may substantially eliminate the toxic effects of a high concentration of auxin (indole acetic acid). Since many herbicides are synthetic auxins or other growth regulators, the results of these experiments suggest that the addition of the solutions of the present invention may detoxify the possible effects of residual herbicides in soil.

It is apparent that there has been provided in accordance with this invention a fertilizer and/or soil amendment which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A solution suitable for use as a fertilizer, said solution consists essentially of from about 0.1% to about 10% L ascorbic acid, from about 10% to about 50% marine algae, from about 3.0% to about 20% nitrogen, from about 3.0% to about 20% phosphorous, from about 3.0% to about 20% potassium, and the balance humic acid in a water solution.

2. A solution according to claim 1 wherein said solution consists essentially of from about 2.0% to about 4.0% L ascorbic acid, from about 12.5% to about 20% marine algae, from about 3.0% to about 10.0% nitrogen, from about 3.0% to about 10.0% phosphorous, from about 3.0% to about 10.0% potassium and the balance humic acid in a water solution.

3. A solution according to claim 1 wherein:
said nitrogen is selected from the group consisting of ammonium phosphate, calcium nitrate, ammonium sulphate, ammonium nitrate, Chilean nitrate, and mixtures thereof.

4. A solution according to claim 1 wherein:
said phosphorous is selected from the group consisting of sodium phosphate monobasic, sodium phosphate dibasic, potassium phosphate, phosphoric acid, other phosphate salts, and mixtures thereof.

5. A solution according to claim 1 wherein:
said potassium is selected from the group consisting of potassium phosphate, potassium iodide, other potassium salts, and mixtures thereof.

6. A solution according to claim 1 which further contains at least one additional constituent selected from the group consisting of from about 0.01% to about 0.2% magnesium, from about 0.01% to about 0.2% manganese, from about 0.001% to about 0.1% boron, from about 0.001% to about 0.1% zinc, from about 0.001% to about 0.1% copper, from about 0.001% to about 0.1% cobalt, from about 0.001% to about 0.1% calcium and from about 0.001% to about 0.1% molybdenum.

7. A solution according to claim 1 which further contains at least one additional constituent selected from the group consisting of up to about 3% iron chelate and up to about 3% ethylene diamine tetra acetic acid.

8. A method for preparing a solution suitable for use as a fertilizer which comprises:
adding from about 1 g/l to about 150 g/l of L ascorbic acid in from about 10 ml to about 150 ml water;
adding from about 100 ml to about 300 ml per liter solution of marine algae in liquid form;
dissolving from about 30 grams to about 200 grams of a nitrogen containing salt into a solution containing said L ascorbic acid and said marine algae;
dissolving from about 30 grams to about 200 grams of a phosphorous salt into said solution;
dissolving from about 30 grams to about 200 grams of potassium salt in said solution;
adding from about 100 ml to about 300 ml of water to hold said solids in suspension; and
adding from about 300 ml to about 700 ml of humic acid in a water solution.

9. The method of claim 8 wherein:
said L ascorbic acid adding step comprises adding from about 20 grams to about 40 grams of L ascorbic acid to about 100 ml of water;
said marine algae step comprises adding from about 125 ml to about 200 ml per liter solution of marine algae;
said nitrogen dissolving step comprises dissolving from about 30 grams to about 100 grams of said nitrogen salt;
said phosphorous dissolving step comprises dissolving from about 30 grams to about 100 grams of said phosphorous salt;
said potassium dissolving step comprises dissolving from about 30 grams to about 100 grams of said potassium salt;
said water adding step comprises adding from about 125 ml to about 200 ml water; and
said humic acid adding step comprises adding from about 400 ml to about 650 ml of humic acid in a water solution.

* * * * *